United States Patent [19]

Schuma et al.

[11] Patent Number: 4,846,550
[45] Date of Patent: Jul. 11, 1989

[54] OPTICAL WEDGES USED IN BEAM EXPANDER FOR DIVERGENCE CONTROL OF LASER

[75] Inventors: Richard F. Schuma, Kinnelon, N.J.; Edward Teppo, Bozeman, Mont.

[73] Assignee: Allied-Signal Inc., Morris Township, Morris County, N.J.

[21] Appl. No.: 1,267

[22] Filed: Jan. 7, 1987

[51] Int. Cl.$^4$ .............................................. G02B 13/10
[52] U.S. Cl. ..................................... 350/421; 350/447
[58] Field of Search ................................ 350/421, 286

[56] References Cited

U.S. PATENT DOCUMENTS 2,258,903 10/1941 Mitchell ............................... 350/447
2,574,712 11/1951 Sachtleben ........................... 350/447
4,017,160 4/1977 Betensky ............................. 350/421

Primary Examiner—Bruce Y. Arnold
Assistant Examiner—Rebecca D. Gass
Attorney, Agent, or Firm—Howard G. Massung

[57] ABSTRACT

Laser beam divergence control is achieved by interposing a pair of optical wedges (41,42) in the beampath of a laser between a pair of lenses (33, 35) of a beam expander (31). The expanded beam has a reduced tendency to jitter during divergence control and the wedges (41, 42) cause a change in divergence by adjusting the optical separation of the lenses (33, 35). By the use of wedges (41, 42) optical length adjustments do not significantly affect directional stability of the beampath.

6 Claims, 1 Drawing Sheet

OPTICAL WEDGES USED IN BEAM EXPANDER FOR DIVERGENCE CONTROL OF LASER

FIELD OF THE INVENTION

This invention relates to optical systems and more particularly to beam expanders for lasers and changing and minimizing the divergence of a laser beam which is transmitted through such a beam expander.

BACKGROUND OF THE INVENTION

Transmitted laser beams, while ideally perfectly collimated, exhibit a certain amount of divergence. The effect of this divergence is to weaken the density of a laser beam which is transmitted over significant distances. In order to reduce this divergence, beam expanders are used to initially expand the laser beam. This results in the laser beam being expanded in diameter by a modification factor:

$$M = \frac{D'}{D} = \frac{a}{a'}, \text{ where}$$

$M$ = magnification factor
$D$ = (unexpanded) laser beam diameter
$D'$ = expanded beam diameter
$a$ = divergence angle of (unexpanded) laser beams
$a'$ = divergence angle of expanded beam By transmitting the laser beam through a beam expander, the angle of divergence is decreased by the magnification factor of a beam expander. Hence beam expanders are used where it is desired to concentrate laser energy transmitted across distances. In those cases, the divergence angle of the laser beam is a significant factor in determining the energy intensity of a laser beam.

The beam expander itself may cause the beam to diverge or converge. In certain applications the beam expander is set to initially diverge the beam. Then, the beam divergence is changed until the best collimation is achieved. The beam may even be caused to converge. For that reason, in order to reduce beam divergence, it is desired to fine tune the optics of a beam expander.

Adjustments are made in prior art beam expanders (FIG. 1) by effecting longitudinal translation of one of the lens groups 13 in the beam expander 11 along its optical axis. In an alignment telescope, for example, the translating lens 13 moves in a lapped cylinder 21 to minimize side-to-side motion that affects beam directivity. A small clearance space between the outside diameter of a lens housing 20 and the inside diameter of the lapped cylinder 21 must be present to permit assembly and to allow for thermal expansion. However, the lens 13 is not fully constrained and tilt and decentralization can occur when the lens 13 is longitudinally shifted. This perturbs the directivity of the beam axis. It is desired not to perturb the directivity of the beam axis because that would remove the laser energy from its intended target.

Accordingly, it is desired to provide a laser beam which has a reduced divergence angle for maximum energy density at a target. It is desired to provide a beam expander to reduce the angle of divergence and to provide for adjustment of the beam expander in a manner which would avoid or greatly reduce tilt and decentralization of the beam.

SUMMARY OF THE INVENTION

Accordingly, a set of optical prisms or wedges of equal power are provided between two lens groups in a beam expander. The wedges vary and control the angle of divergence, or convergence, of a transmitted laser beam without changing the directivity, or angular orientation, of the beam axis. This is accomplished by means of lateral translations of the two wedges by equal and opposite amounts to change the optical separation of the two lens group in the beam expander without affecting their relative centration and alignment. The divergence of the output laser beam is thus varied without changing the directivity of the beam axis. The axial separation of the lens groups in the beam expander can thus be varied without changing their relative optical alignment. The lateral displacement of the beam through the wedges is held constant by orienting input and output outside faces of the wedge pair substantially normal to the beam axis. The wedges are translated in a direction that is in the plane of two mutually parallel internal faces.

DETAILED DESCRIPTION OF THE PREFERRED EMBODIMENT

Figure 1:
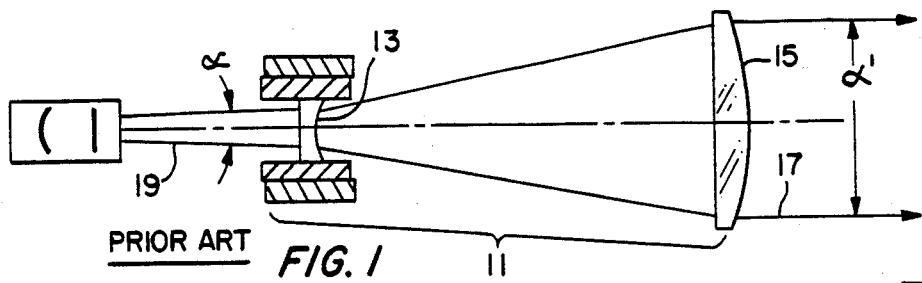
FIG. 1 is an optical schematic representation of a prior art beam expander.

Referring to FIG. 1 (prior art), a beam expander 11 is used to expand the diameter of a laser beam in order to reduce its divergence angle. The divergence angle is reduced by a magnification factor M such that:

$$M = \frac{D'}{D} = \frac{a}{a'}, \text{ where}$$

$M$ = Magnification factor
$D$ = (unexpanded) laser beam diameter
$D'$ = expanded beam diameter
$a$ = divergence angle of (unexpanded) laser
$a'$ = divergence angle of expanded beam By the use of such a beam expander, a more collimated output 17 can be obtained from a given laser input 19.

The beam expander 11 normally consists of two lens groups, represented by convex lens 13 and concave lens 15. By translating one of the lens groups 13 along the optical axis, the beam expander can be fine tuned so to cause the beam divergence to change to a condition of best collimation.

The divergence of the beam 17 is the result of both imperfect collimation by a laser and other optical effects. The beam expander 11 can cause a divergence or convergence of the output beam 17, whereas the minimum angle of divergence is controlled by the differences in the divergence of different portions of the laser output 19. In the prior art, such longitudinal translation was accomplished by allowing the translating lens 13 to move in a lapped cylinder 21.

Figure 2:
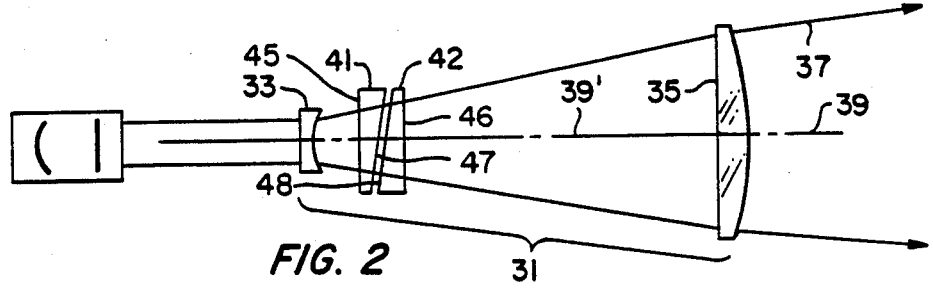
FIG. 2 schematically shows the preferred embodiment of the inventive beam expander.
Figure 3:
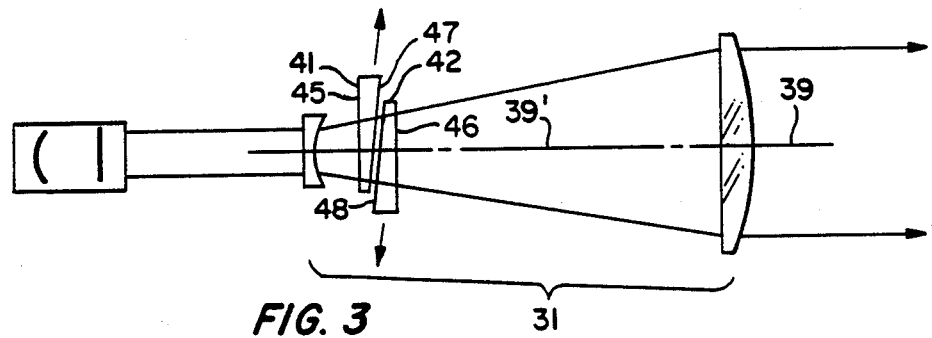
FIG. 3 shows an adjustment of the beam expander of FIG. 2.

Referring to FIG. 2 a beam expander 31 is provided with fixed lens groups 33, 35 in order to stabilize an output beam 37 at its output axes 39. In order to fine tune the beam expander 31, a set of optical wedges or prisms 41, 42 are provided. The optical wedges 41, 42 are preferably provided as a pair of wedges and placed between the lens groups 33, 35 of a beam expander 31 having two lens groups. The wedges 41, 42 do not affect the geometrical separation of the lens groups 33, 35 and do not substantially change the angular orientation of the beam axis 39. The wedges 41, 42 effectively change the optical separation of the lens groups 33, 35.

The wedges 41, 42 are aligned so that their outside faces 45, 46 are perpendicular to the beam axis 39' within the beam expander 31. The wedges have inside faces 47, 48 which are mutually parallel.

In order to adjust or fine tune the angle of divergence of the output 37 of the beam expander 31, the wedges 41, 42 are moved laterally across the beam axis 39' within the beam expander 31. Since the angular orientations of the wedges 41, 42 with respect to the beam axis 39' are relatively uncritical, slight movements of the wedges 41, 42 do not significantly affect centralization and alignment of the output beam 37.

In a specific application it is desired to reduce the divergence of the output beam 37 to 500 rads. When this was attempted with a conventional beam expander, an adjustment mechanism for the beam expander caused significant jitter and consequent problems in tilt decentration and jitter. The use of the wedges 41, 42 avoids such problems and does not create jitter.

Figure 4:
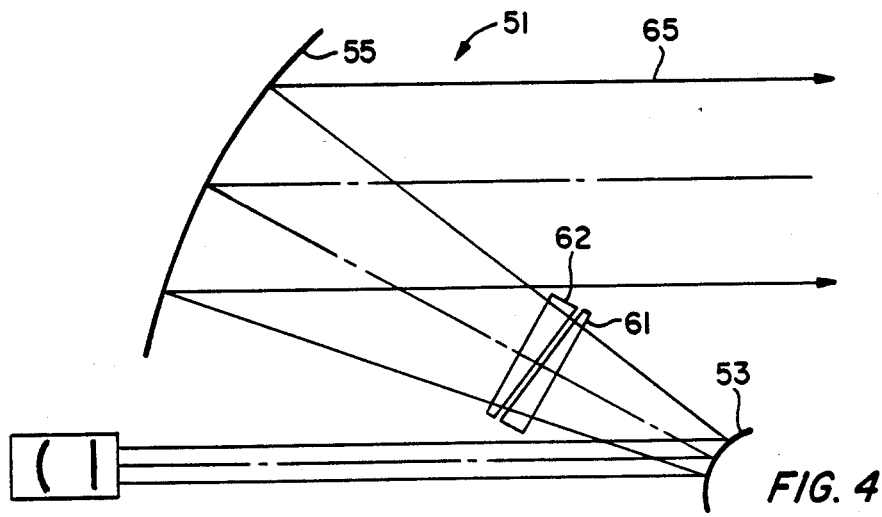
FIG. 4 shows a modified beam expander, in which mirrors are used to expand a laser beam.

It is possible to substitute mirrors for lens groups, as shown in FIG. 4, wherein a beam expander 51 is constructed with mirrors 53, 55 performing the functions of both lens groups. In that arrangement, a pair of wedges 61, 62 is used to fine tune the divergence angle of an output beam 65 in order to minimize the divergence of the output beam 65.

It can be thus seen that it is possible to implement the present invention in a variety of configurations for beam expanders. For example, it may be possible to place the optical wedges 41, 42 in the beam either before or after the beam passes the lens groups 33, 35 or other equivalent optical elements 53, 55. Accordingly, the present invention should be read only as limited by the claims.

We claim:

1. Method of minimizing divergence of laser transmissions from a laser source, characterized by:
   (a) directing said laser transmissions through a first lens unit and a second lens unit having an optical separation from the first lens unit, wherein said transmissions are directed first through the first lens unit from the laser source having a first beam width and the laser transmissions are directed from the second lens unit at a second beam width which is greater by a magnification factor than the first beam width;
   (b) modifying the optical separation with at least one pair of optical prisms positioned between the lens units and across an optical axis of the laser transmissions so that the laser transmissions pass through the prisms;
   (c) laterally translating the prisms with respect to each other until divergence of the laser transmissions from the second lens unit are minimized, said lateral translation also effecting a lateral translation of the prisms across said optical axis, the lateral translation having minimized the effect of beam tilt on the laser transmissions.

2. Method as described in claim 1, further characterized by:
   providing the prisms with an outside face and an inside surface;
   aligning the outside surfaces perpendicularly to the optical axis of the laser transmissions adjacent to the prisms; and
   aligning the inside surfaces to be mutually parallel.

3. Method described in claim 2, further characterized by:
   the lateral translation of the prisms being in a direction parallel to the inside surfaces and effecting a change in the combined thickness of the prisms for the laser transmissions passing through the prisms.

4. Method as described in claim 3, further characterized by:
   the lens units being configured so that energy transmitting through the beam expander is first caused to diverge and is then converged to substantially a zero angle of divergence when the wedges are in a neutral position.

5. Method describedin claim 1, further characterized by:
   the lateral translation of the prisms being in a direction parallel to the inside surfaces and effecting a change in the combined thickness of the prisms for the laser transmissions passing through the prisms.

6. Method as described in claim 1, further characterized by:
   the lens units being configured so that energy transmitting through the beam expander is first caused to diverge and is then converged to substantially a zero angle of divergence when the wedges are in a neutral position.

* * * * *